United States Patent [19]

Manzoni

[11] 4,033,299
[45] July 5, 1977

[54] ROTARY ENGINE

[76] Inventor: Sergio C. Manzoni, 25 Reno Avenue, Hamilton, Ontario, Canada, L8T 2S5

[22] Filed: Jan. 22, 1975

[21] Appl. No.: 542,918

[52] U.S. Cl. .............................. 123/8.43; 418/253
[51] Int. Cl.² ...................................... F02B 53/08
[58] Field of Search ............. 123/8.25, 8.43, 8.45; 418/6, 13, 257, 258, 253

[56] References Cited

UNITED STATES PATENTS

| 141,000 | 7/1873 | Gillespie | 418/257 |
|---|---|---|---|
| 3,181,510 | 5/1965 | Hovey | 123/8.43 |
| 3,527,262 | 9/1970 | Fuchs | 123/8.43 |
| 3,572,985 | 3/1971 | Runge | 123/8.43 X |
| 3,682,143 | 8/1972 | Leas | 123/8.43 X |
| 3,726,259 | 4/1973 | Graves | 418/257 X |

FOREIGN PATENTS OR APPLICATIONS

| 612,489 | 8/1926 | France | 123/8.45 |
|---|---|---|---|
| 2,015,936 | 10/1971 | Germany | 123/8.43 |
| 342,264 | 1/1931 | United Kingdom | 123/8.43 |

*Primary Examiner*—Carlton R. Croyle
*Assistant Examiner*—Michael Koczo, Jr.

[57] ABSTRACT

This rotary engine performs the same four phases as any other piston and rotary engine. Yet, unlike other engines this one has no crankshaft. It consists of a circular housing in which a circular rotor revolves slightly off center in relation to its housing.

The rotor carries through its cavity vanes (or blades) that are kept continuously close to the housing by the centrifugal force as the rotor turns. The vanes never touch the housing, they are kept at a safe distance by a ring which is guided by a ball bearing. To make the contact gas-tight each vane is tipped with an inset metal strip.

The rotor with its vanes rotating in its housing develops two expanding-contracting chambers, one inside it and the other peripheral to the housing.

The inside chamber is to intake the mixture and pump it into the peripheral or combustion chamber, this will decrease in volume compressing the mixture, as the rotor edges by the spark plug the fuel-air mixture is ignited, the exploding gas pushes the rotor in its circular motion.

All the while the inside chamber continues its intake of fresh mixture and pumps it into the combustion chamber.

The cycle is then repeated.

2 Claims, 4 Drawing Figures

ROTARY ENGINE

SUMMARY OF THE INVENTION

The attempt is to harmonize an assembly that will sprint power with equilibrium and perform with minimum friction. Composed of very few parts to yield a low weight per H.P. within a pattern to be economic to build and especially economic to re-tool.

The invention overcomes some objection of some known rotary engine where the effort was made to eliminate some friction the entire housing was put into rotation with the rotor eliminating the initial gain.

Other problems are associated with the gas transfer, known rotary engines do transfer compressed mixture from one chamber to another increasing the danger of pre-ignition.

Other rotary had their blades put in between two joints having the same blades choked by these joints when the centrifugal force increases at high R.P.M.

The invention relates to the rotary drum type internal combustion engine. This particular type employs a rotor eccentrically located in its housing, the rotation of the rotor with its vanes provides the intake chambers and the combustion chambers to increase and decrease the volume giving the engine the four phases needed to generate its revolution. The intake begins at the internal chambers, here the air or mixture merely passed through these chambers whose volumetric capacity can be shaped to size to supply the exact amount of air to fill the combustion chambers. The transfer of the mixture from the inside chambers to the outside chambers is achieved with great easiness under the effect of the centrifugal force and so can be said of the discharging gases, this flow of air also provides the cooling. The combustion chambers of course provide the suction effect to withdraw the mixture away from the exhaust like every two cycle engine.

The main object to be mentioned is the blade-supporting-ring which guides the blades into abutment against the inner and the outer cylinders, the centrally mounted bearing ring is there to absorb the centrifugal force created by the blades that would otherwise generate the unwanted friction, however the blade-supporting-ring ensures that the real contact is done only by the tip-seals. The drawings academically show illustrations about the seals because many ways can be developed to produce an efficient seal.

Counterweights are not needed on this engine. A multi-rotor is also feasible.

BRIEF DESCRIPTION OF VIEWS

FIG. 1 shows a longitudinal section of the engine.
FIG. 2 shows a section along the line A—A in FIG. 1.
FIG. 3 shows a section along the line B—B in FIG. 1.
FIG. 4 similar to FIG. 1 exception made for the rotor having the ball bearings on each side.

DETAILED DESCRIPTION

Figure 1:
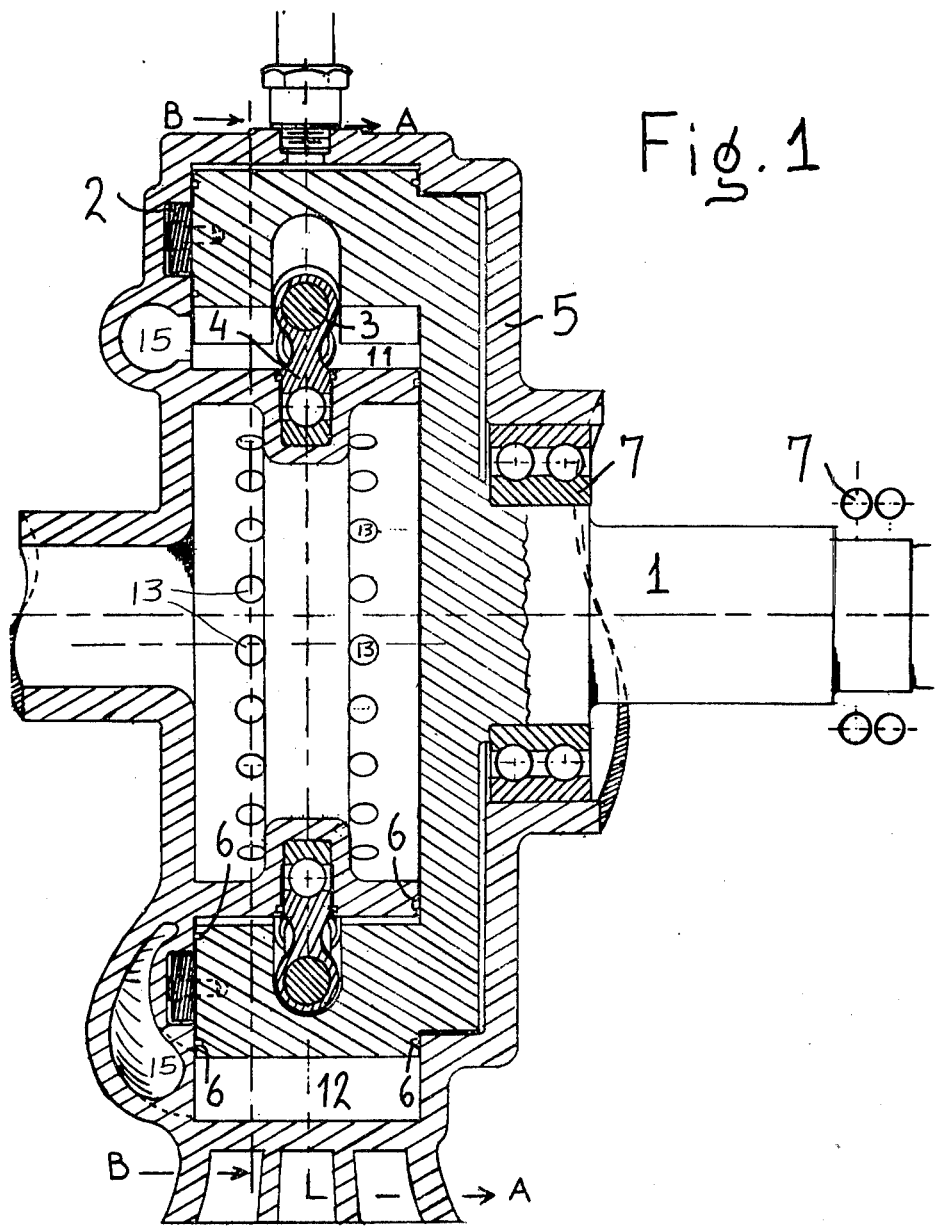

As appears from the longitudinal section in FIG. 1 the rotor 1 with its axle rotates freely on bearings 7 in addition is provided with a flange 2 to prevent the deformation caused by the centrifugal force.

The rotor 1 is mounted inside its housing or casing 5 which makes up the walls and cylinders around it, both the rotor 1 and the casing 5 carry a number of piston like ring seals 6, a series of openings 13 are located internally on the internal chambers 11 for the mixture intake. The manifold 15 is partly visible.

Figure 2:
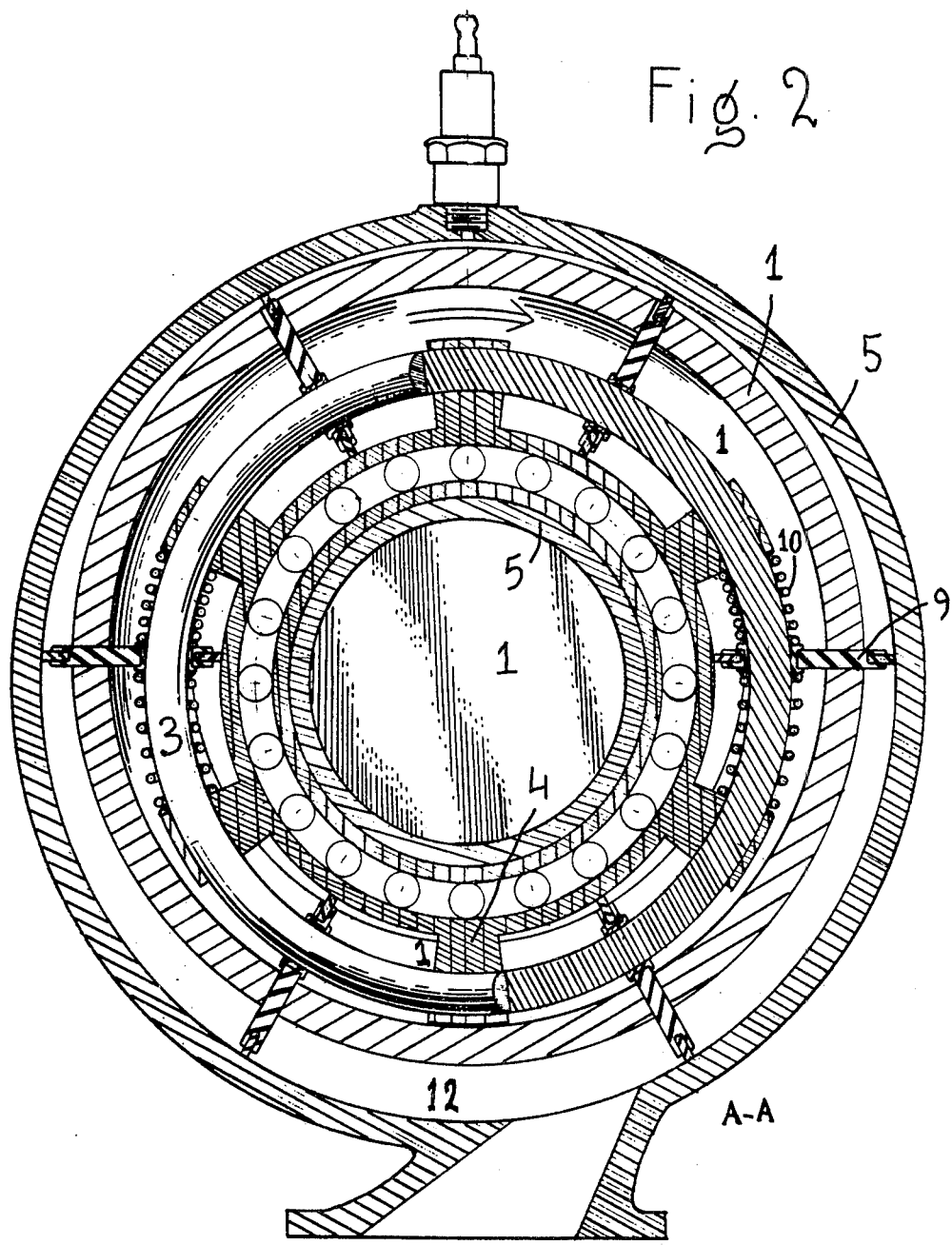

FIG. 2 is a section along the line A—A in FIG. 1, it shows how the ring 3 would support the blades 9 keeping them in place irrespective of the number of revolutions of the machine, the ring 3 is held in place by the ball bearings 4 having on the outer race extensions to hold the ring firm in place, two pairs of springs 10 are arranged on two blades 9 (one opposite to the other) to prevent said blades 9 to get in contact with the joints of bearings 4.

Figure 3:
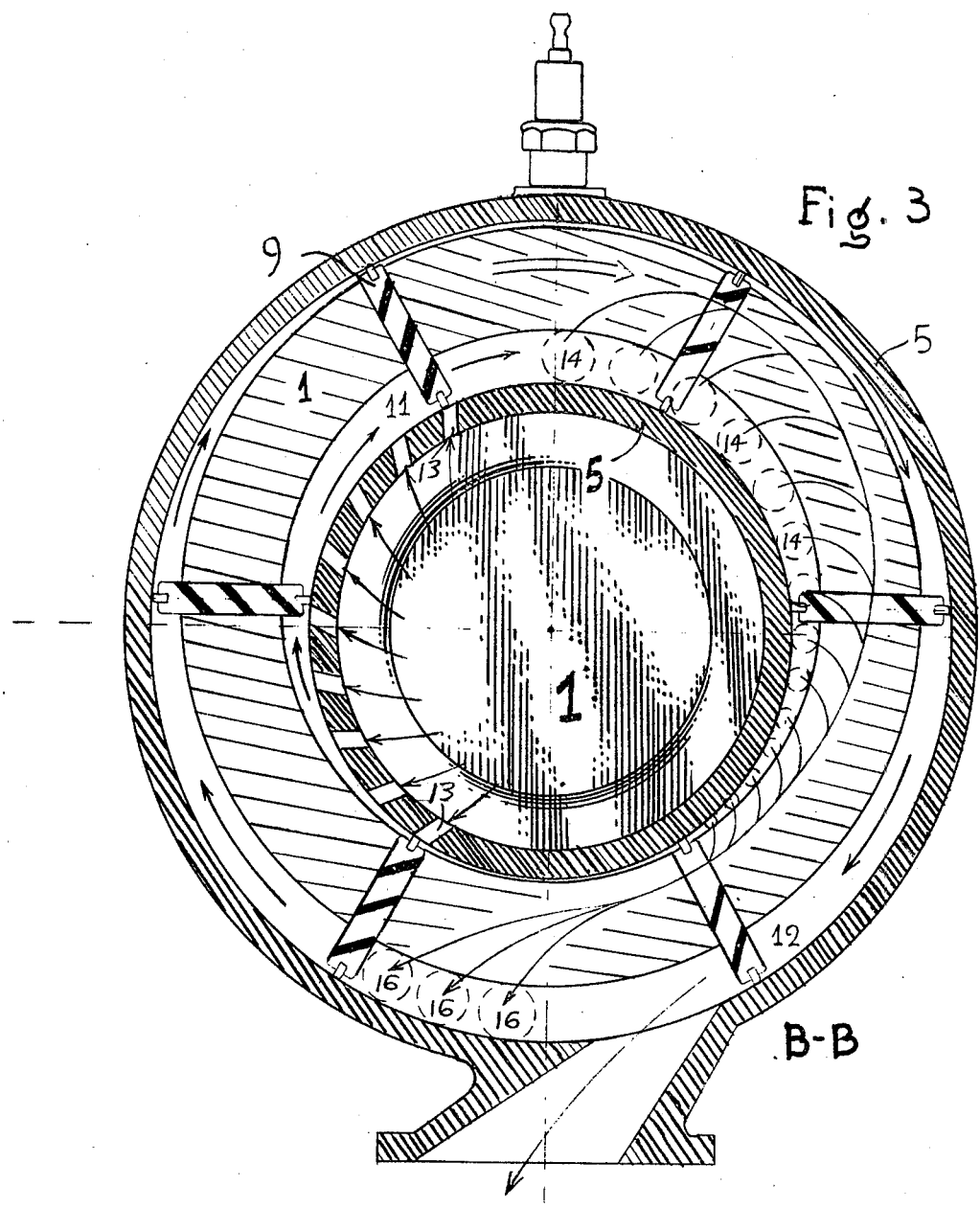

FIG. 3 is a section along the line B—B in FIG. 1, this illustration merely shows the flow of the air or mixture through the engine, the plurality of arrows at the center show the ample openings 13 provided in the casing 5 to give the internal chambers 11 an easy intake, once the air is caught in the whirl of the internal chambers 11 it generates the impulse to outspread like in any centrifugal compressor, to favor this natural flow the openings 14 (dotted holes) which dislodge the air are placed on the walls of the casing 5, as the array of lines show the mixture is transferred through the manifold 15 (FIG. 1) and the openings 16 to the combustion chambers 12 with adequate ease, at this point the combustion chambers 12 provide the vacuum to suck the mixture and consequently compress, burn and exhale.

Figure 4:
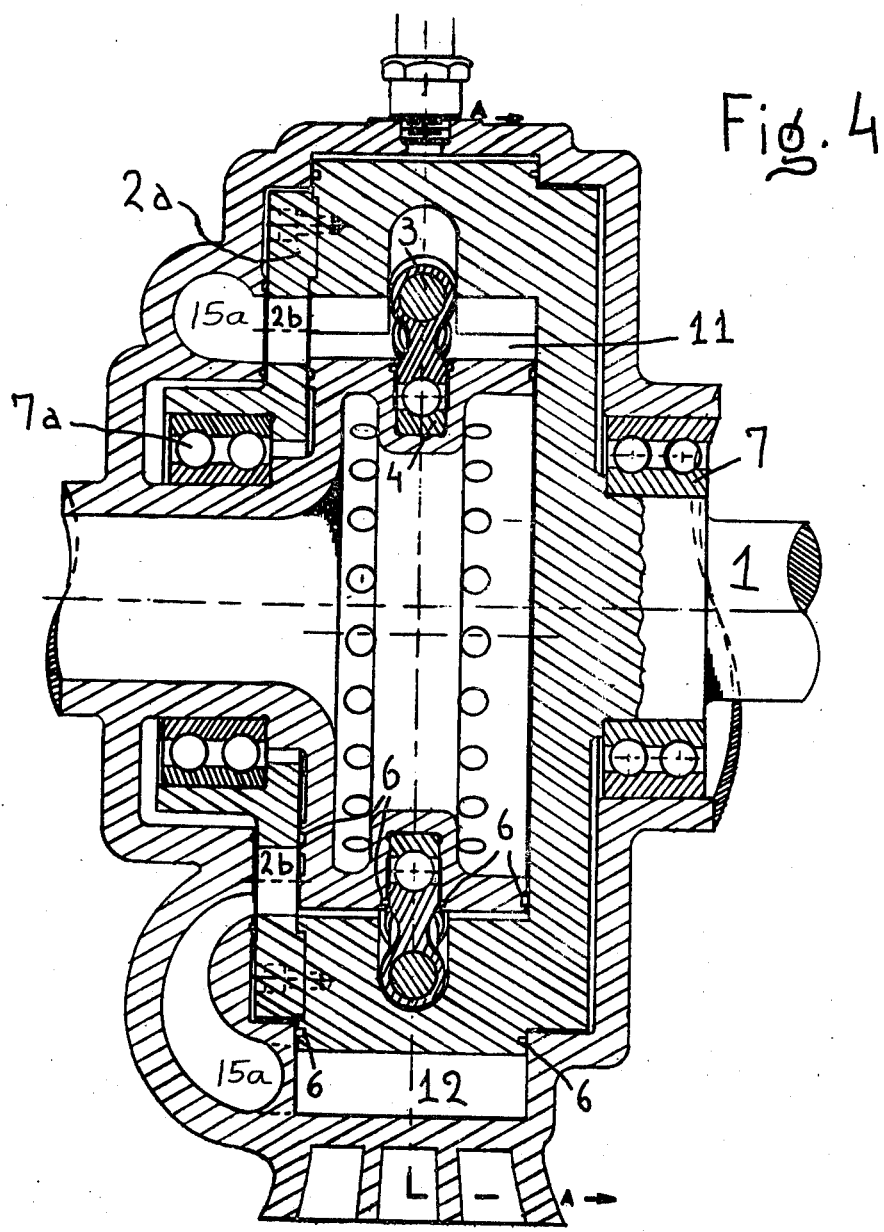

FIG. 4 is a repetition of FIG. 1 except for the flange 2a, which is carried on ball bearings 7a, has a line of holes 2b all around it to let the mixture out of the intake chambers 11 through the manifold 15a into the combustion chambers 12 and said flange 2a is embodied with the rotor 1 to become an extension of it.

Cycle: operation of the motor can be best understood by referring to FIG. 3 which academically describes the four phases of the two cycle rotary engine.

The cycle begins at the center of the engine where the air is received into the internal chambers 11 through the openings 13, as the rotor moves in a clockwise direction the internal chambers 11 reach full volume capacity after they move from 6 to 12 o'clock, in this position the internal chambers 11 start decreasing its volumetric capacity, while they move clockwise from 12 to 6 o'clock the air is pushed out through the lateral passage 14 into the manifold 15 (see lines), at this point the manifold 15 is filled with air speeding out through the exit 16 as the arrangement of lines from numeral 14 to 16 indicate the pattern of the mixture in the manifold. Now the combustion chambers 12 on the 6 o'clock receive a flush of air or mixture with enough impetus to repel the exhaust gases from being recycled, at the same time the combustion chambers 12 while moving clockwise produce a vacuum to help retrieve the fresh mixture, as the rotor turns clockwise the combustion chambers 12 compress the mixture, once these chambers reach 12 o'clock the gases are under maximum compression, here ignition occurs. The rotor and its vanes are thus subjected to a power cycle in a clockwise direction, now the combustion chambers 12 receive a thrust of 120° and it terminates its cycle once the combustion chambers 12 reach the exhaust port on the 6 o'clock.

It is understood that the drawings are designed for the purpose of illustration only and not as a definition of the limits of the invention as to which reference should be made to the appended claims. It is also understood that the apparatus is capable of mechanical alteration without departing from the spirit of the invention.

What I claim is:

1. A rotary internal combustion engine comprising in combination:

a stationary housing comprising an inner and outer concentric cylinder, assembled in between walls or end plates forming an annular chamber, an annular rotor eccentrically located into said annular chamber forming the inner and outer working chambers, a shaft secured to the rotor on one side and extending through the housing and being fastened in an end plate, a flange embodied to the rotor on the side opposite the shaft, said rotor including radially disposed and movable vanes for continuous engagement with the interior of the casing during rotation of the rotor, said rotor being concentrically mounted on said shaft and eccentrically oriented in relation to the casing for providing expanding and contracting chambers between adjacent vanes during the rotation of the rotor, means interlocking the vanes for restraining them radially inwardly and outwardly against the interior of the casing, said casing including means admitting a compressible and combustible mixture into the inner chambers, passage means for transferring the mixture from the inner chambers to the outer working chambers for compression and ignition by rotation of the rotor therein, passage means communicating the outer working chambers with the exterior of the casing after combustion, said means interlocking the vanes including an annular ring journalled through the vanes, said annular ring being concentric with the center of the casing, rotatable means journalled on the inner cylinder of the casing including a bearing with connecting joints securing said annular ring, thereby maintaining the vanes under control at all times.

2. A rotary internal combustion engine as set forth in claim 1:

wherein said flange comprises an annular extension of the rotor and includes means for transferring the mixture from the inner chambers to the outer working chambers, said means including passageways extending through the annular extension and communicating with both sides thereof, said annular extension also including an annular recess at the inner diameter to receive a rotatable means which is eccentric with the center of the casing and concentric with the center of the rotor, said rotatable means journalled on the internal portion of the housing in combination with said annular extension imparting added support to the rotor.

* * * * *